United States Patent
Sakashita (10) Patent No.: US 6,507,368 B1
(45) Date of Patent: Jan. 14, 2003

(54) CONTROL OF IMAGE SIGNALS IN LIQUID CRYSTAL DISPLAYS

(75) Inventor: Yukihiko Sakashita, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/493,260

(22) Filed: Jan. 28, 2000

(30) Foreign Application Priority Data

Jan. 29, 1999 (JP) ............................................ 11-022750

(51) Int. Cl.$^7$ ............................................... H04N 07/01
(52) U.S. Cl. ...................... 348/448; 348/441; 348/443; 348/458
(58) Field of Search ................................ 348/458, 448, 348/459, 443, 445, 441, 452, 910, 558; 345/204, 87; H04N 7/01

(56) References Cited

U.S. PATENT DOCUMENTS

| | | | | |
|---|---|---|---|---|
| 4,866,520 A | * | 9/1989 | Nomura et al. | 348/441 |
| 5,260,786 A | | 11/1993 | Kawashima et al. | 358/140 |
| 5,488,422 A | * | 1/1996 | Faroudja et al. | 348/448 |
| 5,661,525 A | * | 8/1997 | Kovacevic et al. | 348/452 |
| 5,825,429 A | * | 10/1998 | Shirahata | 348/448 |
| 5,850,264 A | * | 12/1998 | Agarwal | 348/469 |
| 6,166,772 A | * | 12/2000 | Voltz et al. | 348/448 |
| 6,262,773 B1 | * | 7/2001 | Westerman | 348/448 |
| 6,269,484 B1 | * | 7/2001 | Simsic et al. | 725/151 |
| 6,348,949 B1 | * | 2/2002 | McVeigh | 348/452 |
| 6,380,978 B1 | * | 4/2002 | Adams et al. | 348/452 |

FOREIGN PATENT DOCUMENTS

| | | |
|---|---|---|
| JP | 4-157886 | 5/1992 |
| JP | 6-315140 | 11/1994 |
| JP | 8-265708 | 10/1996 |

* cited by examiner

Primary Examiner—John Miller
Assistant Examiner—Jean W. Desir
(74) Attorney, Agent, or Firm—Fitzpatrick, Cella, Harper & Scinto (57) ABSTRACT

This invention is to enable, at low cost, image display with little line flicker based on an interlaced image signal and satisfactory movie display characteristics. The first de-interlace mode in which interlaced scanning line signals in the consecutive odd- and even-numbered fields are received by storage means, and the scanning line signals in the consecutive odd- and even-numbered fields are alternately read out to perform de-interlacing, and the second de-interlace mode in which scanning line signals in the odd- or even-numbered field are read out in units of fields and magnified in the vertical direction to perform de-interlacing are prepared. The scanning line signals are compared between the fields to determine whether the signal is a movie or a still image. When it is determined that the signal is a still image, the signal is displayed on a display device using a non-interlaced signal obtained in the first de-interlace mode. When it is determined that the signal is a movie, the signal is displayed on the display device using a non-interlaced signal obtained in the second de-interlace mode.

4 Claims, 7 Drawing Sheets

NOTE: (y, z) = (LINE, FIELD)

CONTROL OF IMAGE SIGNALS IN LIQUID CRYSTAL DISPLAYS

BACKGROUND OF THE INVENTION

1. Field of the Invention

The present invention relates to a display apparatus and, more particularly, to an image signal processing apparatus and method which are suitable for a large display panel such as a liquid crystal projector.

2. Related Background Art

Conventionally, for non-interlaced display of a TV image signal as an interlaced image signal on a liquid crystal display device, the following attempts (1) and (2) have been made as disclosed in Japanese Patent No. 2727583 in which vertical resolution is increased, and flicker in image is reduced using a line memory, field memory, or frame memory.

(1) Assume that a TV image is displayed on, e.g., a liquid crystal display. A TV image signal is an interlaced signal that forms one image by two fields (=one frame). In Japan, the frame frequency is 30 Hz, and the update period of an image signal of one scanning line is 30 Hz. When a TV image is displayed on the liquid crystal display in the interlace mode, the rewrite frequency of image data of one scanning line is 30 Hz. This appears as flicker on the screen because of the holding characteristics of the liquid crystal, resulting in very poor image quality.

(2) To prevent this flicker, an image is formed using, e.g., a line memory in a pseudo non-interlace mode.

Figure 8:
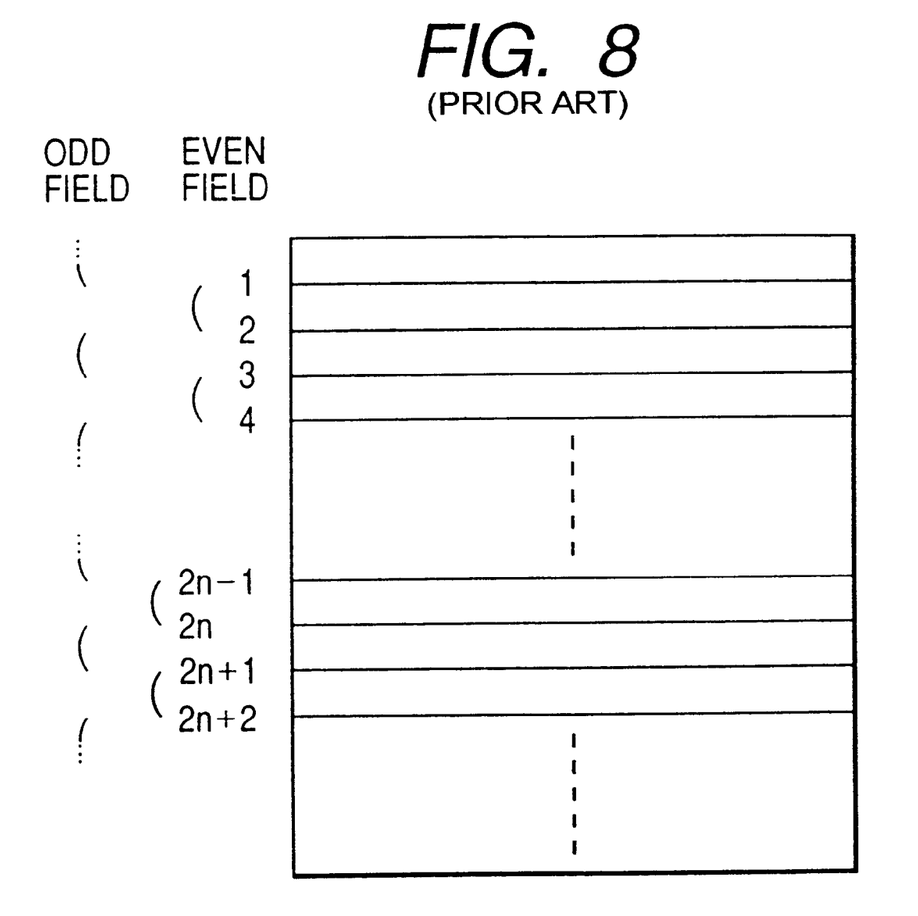
FIG. 8 is an explanatory view showing an example of a conventional display method.

FIG. 8 shows a display section for such image display. In the odd-numbered field, one image signal is displayed on the first line, image signals of the same scanning line are displayed on the second and third lines, . . . , image signals of the same scanning line are displayed on the (2n)th and (2n+1)th lines. In the even-numbered field, image signals of the same scanning line are displayed on the first and second lines, . . . , image signals of the same scanning line are displayed on the (2n−1)th and (2n)th lines. The image data rewrite frequency is 60 Hz that is equal to the field frequency. Hence, no flicker occurs, and vertical resolution does not degrade.

In the conventional liquid crystal projector, a conventional line doubler is used for de-interlace by the method (1) or (2). However, in the method (2), the image quality is degraded by line flicker, and characters are difficult to recognize because of low resolution. In the method (1), images of consecutive odd- and even-numbered fields are simultaneously displayed on one frame, a movie is displayed as a double image. A method of discriminating between a still region and a movie region in one frame and processing them by different processes has also been developed. However, high cost due to an increase in frame memory or hardware poses a problem.

Under these circumstances, a demand has arisen for an apparatus and method capable of realizing optimum display for each of a still image and a movie at low cost.

Especially, in a liquid crystal projector which projects an image for magnification display, relative degradation in resolution due to magnification display or line flicker in the interlace mode (a display image flickers at its edge portion in units of lines because scanning lines of odd-numbered lines and scanning lines of even-numbered lines are alternately displayed in interlaced display) is conspicuous and poses a serious problem for a large display panel.

The present invention has been made in consideration of the problems of the prior art, and has as its object to enable, at low cost, image display with little line flicker based on an interlaced image signal and satisfactory movie display characteristics.

SUMMARY OF THE INVENTION

In order to achieve the above object, according to the present invention, the first de-interlace mode in which interlaced scanning line signals in the consecutive odd- and even-numbered fields are received by storage means, and the scanning line signals in the consecutive odd- and even-numbered fields are alternately read out to perform de-interlacing, and the second de-interlace mode in which scanning line signals in the odd- or even-numbered field are read out in units of fields and magnified in the vertical direction to perform de-interlacing are prepared. The scanning line signals are compared between the fields to determine whether the signal is a movie or a still image. When it is determined that the signal is a still image, the signal is displayed on a display device using a non-interlaced signal obtained in the first de-interlace mode. When it is determined that the signal is a movie, the signal is displayed on the display device using a non-interlaced signal obtained in the second de-interlace mode.

De-interlace used in this application will be described below.

In the current TV broadcasting, one image (one frame) is segmented into two images, i.e., an image of odd-numbered lines and an image of even-numbered lines (these images are called an odd-numbered field and even-numbered field, respectively), and transmitted. In a TV (CRT), the odd-numbered field image is displayed on odd-numbered lines of the CRT, and the even-numbered field image is displayed on even-numbered lines of the CRT. This display scheme is called interlaced display.

In a display (CRT or LCD) used for a personal computer or the like, image data of one frame is sequentially displayed on odd- and even-numbered lines without segmenting the image data into odd- and even-numbered fields. This display scheme is called progressive display.

To display a current TV broadcasting signal on the display of a personal computer or the like in the progressive display mode, the interlaced signal must be converted into a progressive signal. This conversion is called de-interlace. In Japan, it is also called non-interlaced display.

BRIEF DESCRIPTION OF THE DRAWINGS

FIGS. 2A1, 2A2 and 2A3 are explanatory views of the first de-interlace processing method of the present invention;

FIGS. 3B1 and 3B2 are explanatory views of the second de-interlace processing method of the present invention;

DESCRIPTION OF THE PREFERRED EMBODIMENTS

According to the above arrangement, even when an interlaced image signal input from a video camera or the like is used, image data with resolution optimum to the characteristics of the input image data can be displayed. Since a still image and a movie can be optimally displayed at low cost, even a large display panel can display high-quality, high-definition image data.

Especially, in a large display panel such as a liquid crystal projector which projects an image for magnification display, relative degradation in resolution due to magnification display or line flicker in the interlace mode is prevented. Hence, display resolution and image quality can be greatly improved at low cost.

In the present invention, the apparatus may also have a means for switching between an automatic selection mode wherein the first and second de-interlace means are automatically switched on the basis of the result from a movie/still discriminate means in a display control means and a manual selection mode wherein one of the first and second de-interlace means is forcibly selected.

Embodiments of the present invention will be described below with reference to the accompanying drawings.
(First Embodiment)

Figure 1:
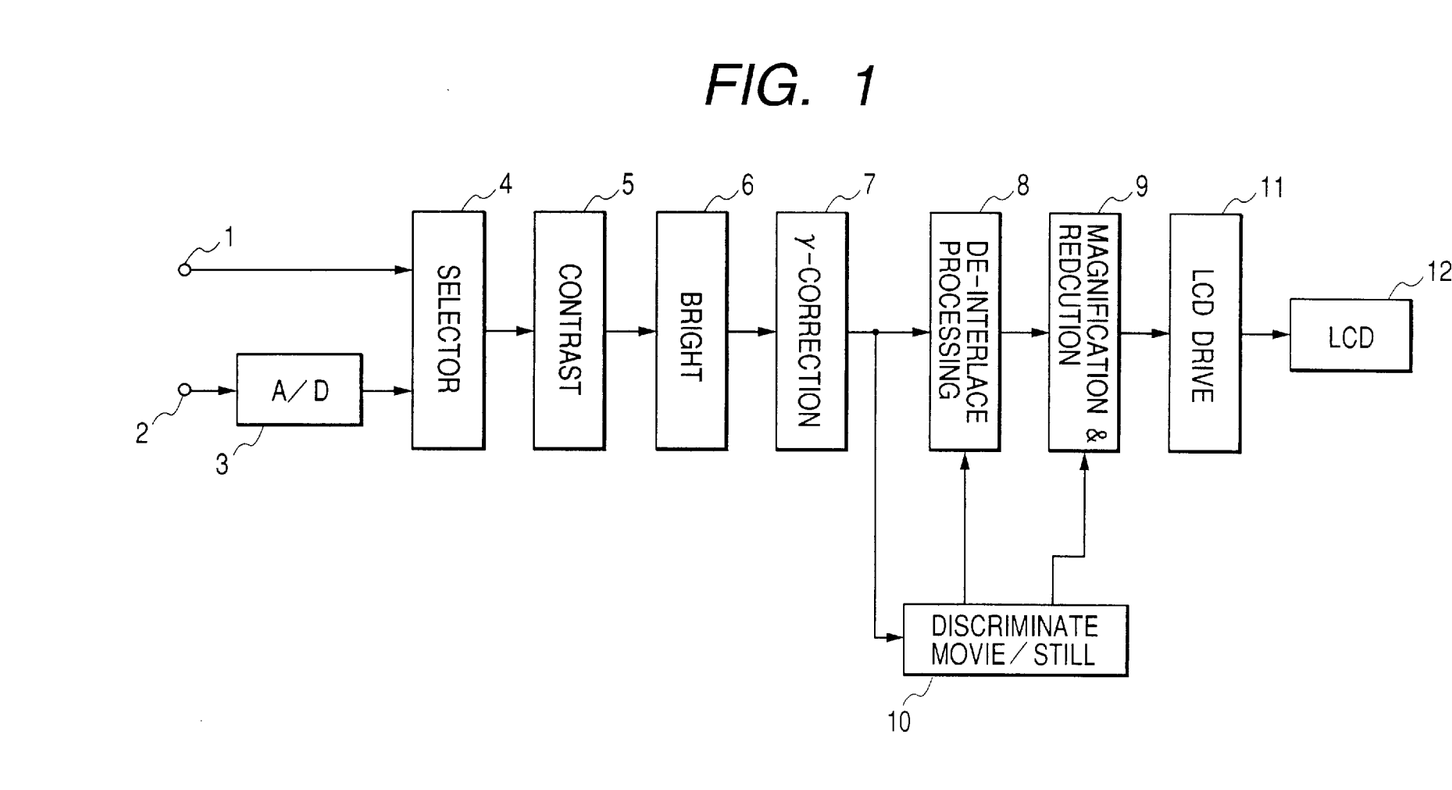
FIG. 1 is a block diagram showing the circuit arrangement of an image signal processing apparatus according to the first embodiment of the present invention.

FIG. 1 is a block diagram showing the circuit arrangement of an image signal processing apparatus according to the first embodiment of the present invention. Referring to FIG. 1, the image signal processing apparatus has an input terminal 1 for inputting a digital image signal, an input terminal 2 for inputting an analog image signal, an A/D converter 3 for converting the analog signal input from the input terminal 2 into a digital signal, a selector circuit 4 for selectively outputting one of the digital signal input from the input terminal 1 and the digital signal output from the A/D converter 3, a contrast adjustment circuit 5, a bright adjustment circuit 6, a γ-correction circuit 7, a de-interlace processing circuit 8 capable of selecting one of two or more de-interlace methods, a magnification & reduction circuit 9 capable of setting two or more magnification ratios, a discriminate circuit 10 for discriminating whether the input signal is a movie signal or a still image signal, an LCD drive circuit 11, and a liquid crystal display device 12 serving as a display device.

Figure 2A:
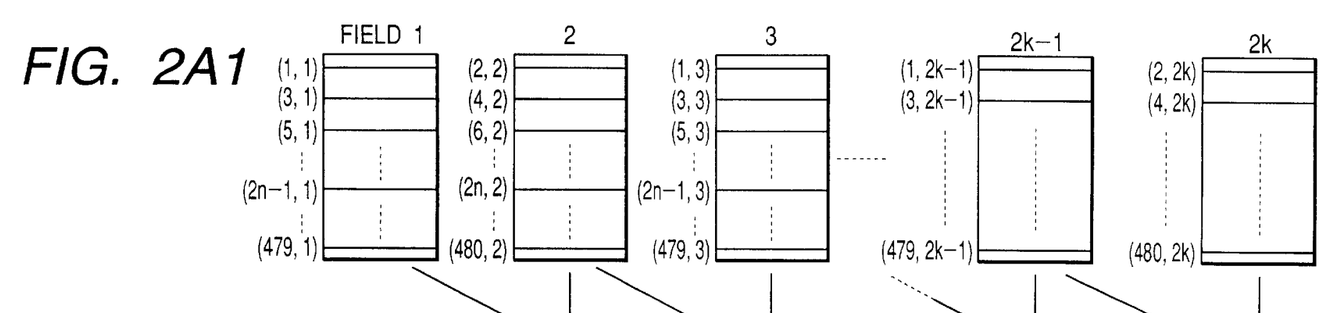
Figure 2A:
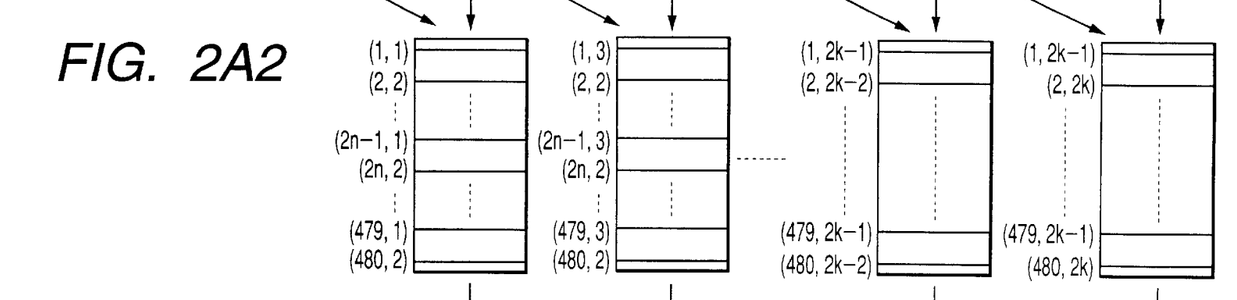
Figure 2A:
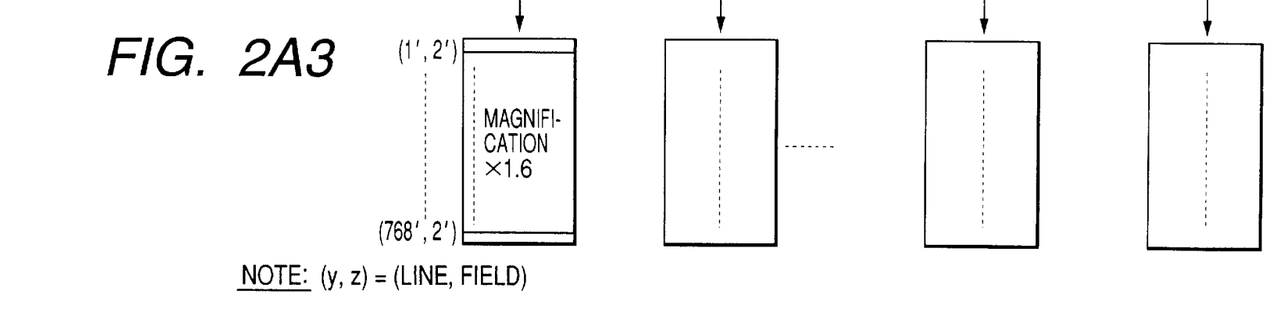
Figure 3B:
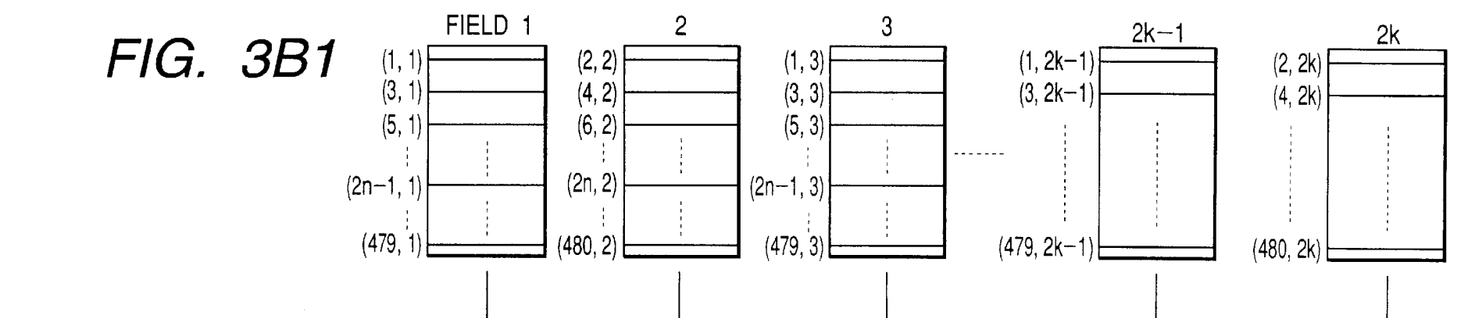
Figure 3B:
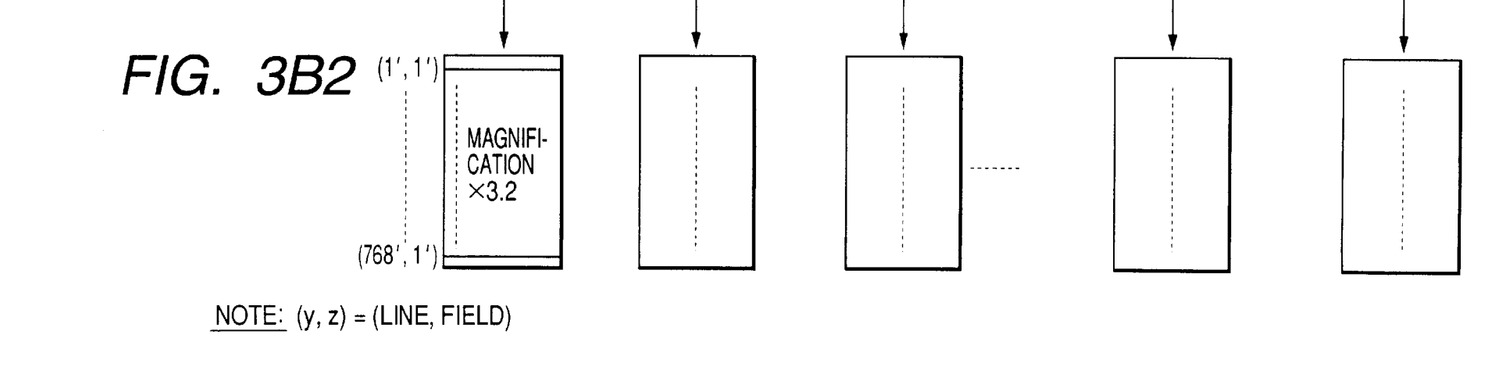

The de-interlace method used in the present invention will be described first with reference to FIGS. 2 and 3.

An NTSC TV signal is an interlaced image signal that divides one frame signal having 525 horizontal lines (horizontal scanning lines) into an odd-numbered field with 262.5 horizontal lines and an even-numbered field with 265.5 horizontal lines. A case wherein an image signal having 480 horizontal lines (the odd-numbered field has 240 lines, and the even-numbered field has 240 lines), which is obtained by excluding a blanking period from 525 horizontal lines, is displayed on a liquid crystal panel in an XGA size (1024 horizontal pixels×768 vertical pixels) will be described.

When the movie/still discriminate circuit determines that the signal is a movie signal, each of the odd- and even-numbered field images is magnified by 3.2 to increase the number of horizontal lines from 240 to 768, and the images are displayed on the liquid crystal panel. The images of the odd- and even-numbered fields are shifted in the vertical direction in accordance with the line layout in the interlace mode. When the images are shifted and displayed, resolution in the interlace mode can be maintained.

The reason why the images are shifted in the vertical direction and displayed will be described below in detail.

In the conventional CRT, when odd-numbered lines (N/2) and even-numbered lines (N/2) of N interlaced signals of one frame are displayed in a superposed manner, resolution decreases to ½ (N/2). In a TV, the odd-numbered field is displayed on the scanning lines of odd-numbered lines, and the even-numbered field is displayed on the scanning lines of even-numbered lines by interlaced display, thereby preventing degradation in resolution.

When an interlaced signal is converted into a progressive signal and displayed, the display relationship between the scanning lines of the odd-numbered lines and those of the even-numbered lines must be maintained.

In the conventional method without magnification, in which data of odd-numbered lines in the odd-numbered field are consecutively displayed on the pixels of two scanning lines (e.g., the first and second scanning lines), and data of even-numbered lines in the even-numbered field are consecutively displayed on the pixels of two scanning lines (e.g., the first and second scanning lines), a relationship equivalent to that of interlaced display can be obtained by shifting the image by one line in each field.

When an image is magnified, the way of shifting each field must be changed in accordance with the magnification ratio. When an image is magnified by 3.2, as in this embodiment, pixel data on one scanning line becomes pixel data on 3.2 scanning lines. For this reason, ideally, the image is preferably displayed by shifting selected scanning lines by 1.6 lines in the vertical direction.

Actually, interpolation calculation for magnification is performed such that the image data is displayed by shifting selected scanning lines by 1.6 lines in the vertical direction.

For magnification display, when a filter operation such as linear interpolation is performed instead of simply displaying each line repeated by the magnification ratio, an oblique line can also be smoothly displayed without jag.

When the movie/still discriminate circuit determines that the signal is a still image signal, the horizontal lines of the odd-numbered field and those of the even-numbered field, which are consecutive, are alternated to form an image having 480 lines. The image is magnified by 1.6 and converted into an image signal having 768 lines, and the image signal is displayed.

When lines are simply repeated in accordance with the magnification ratio to magnify the image, the magnification ratio is an integer multiple. In the present invention, since interpolation is performed on the basis of data of lines to obtain an inter-line image corresponding to a portion between lines of the original image, the image can be magnified to not an integer multiple but by 1.6 including a decimal point.

The first embodiment will be described with reference to FIG. 1.

An image signal to be displayed on the display device is input from the digital image signal input terminal 1 or analog image signal input terminal 2. An image signal input from the analog input terminal is converted into a digital signal by the A/D converter 3. Digital image signals from the input terminal 1 and through the A/D converter 3 are input to the selector circuit 4. One of the digital image signals is selected by a selection signal from a CPU (not shown) and output. The contrast adjustment circuit 5 adjusts the contrast of the image signal output from the selector circuit 4, and the bright adjustment circuit 6 adjusts the bright of the image signal. The signal output from the bright adjustment circuit 6 is input to the γ-correction circuit 7 to remove gamma characteristics for the CRT, which are imparted to the input image signal in advance, and γ-correct the signal in accordance with the display characteristics of the display device (LCD).

The de-interlace processing circuit 8 can select two or more de-interlace methods. When the movie/still discriminate circuit 10 determines that the image signal is a movie signal, the image signals of the odd- and even-numbered fields are directly output and magnified by 3.2 by the magnification & reduction circuit 9 in units of fields to convert the number of horizontal lines in each field from 240 to 768 such that the image is displayed on the liquid crystal panel in the XGA size (1024×768), as described with reference to FIGS. 3B1 and 3B2. The images of the odd-and even-numbered fields are shifted in the vertical direction in accordance with the line layout in the interlace mode and displayed.

When the movie/still discriminate circuit 10 determines that the signal is a still image signal, the de-interlace processing circuit 8 alternates the lines of the even-numbered field and those of the odd-numbered field, which are consecutive, to form an image having 480 horizontal lines, and the image is magnified by 1.6 and converted into an image signal having 768 lines such that the image is displayed on the liquid crystal panel 12, as described with reference to FIGS. 2A1 to 2A3. For the image signal output from the magnification & reduction circuit 9, the LCD drive circuit 11 adjusts the image signal output timing or generates a drive signal in accordance with the timing of the liquid crystal panel. The image is displayed on the liquid crystal display device 12 by the image signal and drive signal output from the LCD drive circuit 11.

The magnification & reduction circuit 9 of this embodiment can also be used to display a magnified or reduced VGA (640×480), SVGA (1280×1024), or SXGA (1280×1024) image signal on a display device (e.g., XGA (1024×768)) having the fixed number of pixels, resulting in an advantage in cost.

(Second Embodiment)

Figure 4:
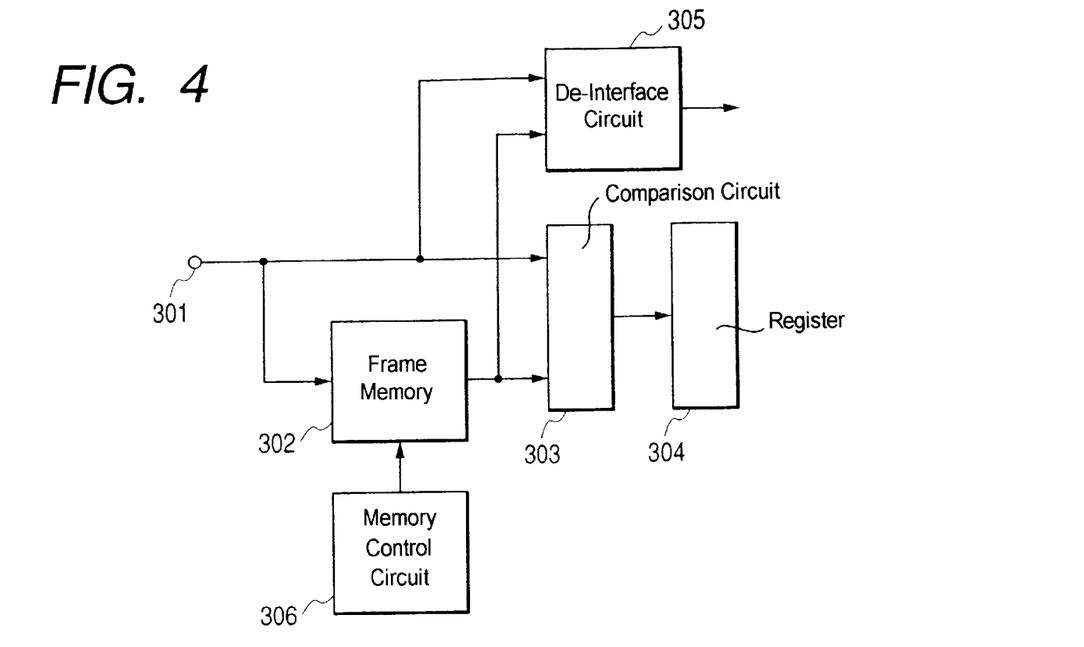
FIG. 4 is a block diagram showing a movie/still discriminate circuit according to the second embodiment of the present invention.

FIG. 4 shows a specific example of the movie/still discriminate circuit. An image signal input from an input terminal 301 is delayed by a storage means 302 such as a frame memory by at least one field. The delayed signal is compared with the undelayed signal by a comparison circuit 303 to determine whether the comparison result has a value larger than a predetermined value. The result is stored in a register 304. When the value is equal to or larger than the predetermined value, the image signal is determined as a movie or a still image. A de-interlace circuit 305 receives the signal delayed by the frame memory and the undelayed signal and performs de-interlacing. The movie/still discriminate circuit also has a memory control circuit 306.

In this arrangement, the storage means 302 can serve as both the storage means for the movie/still discriminate circuit and that for de-interlacing. For this reason, the cost can be reduced.

(Third Embodiment)

Figure 5:
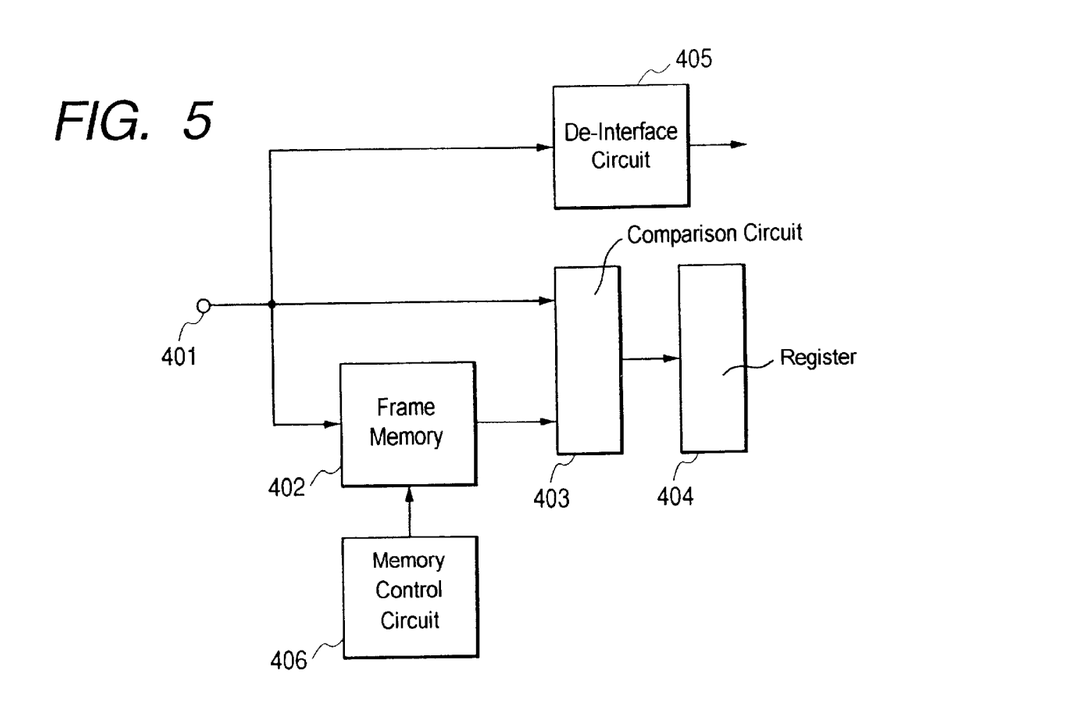
FIG. 5 is a block diagram showing a movie/still discriminate circuit according to the third embodiment of the present invention.

FIG. 5 shows another specific example of the movie/still discriminate circuit. An image signal input from an input terminal 401 is delayed by a storage means 402 by at least one field. The delayed signal is compared with the undelayed signal by a comparison circuit 403 to determine whether the comparison result has a value larger than a predetermined value. The result is stored in a register. When the value is equal to or larger than the predetermined value, the image signal is determined as a movie or a still image. A de-interlace circuit 405 receives the signal delayed by a frame memory in the de-interlace circuit and the undelayed signal and performs de-interlace processing. A memory control circuit 406 selects at least one pixel in the field, stores the pixel in the storage means 402, and generates a timing of comparison between the delayed signal and an undelayed signal in a different field, which corresponds to the delayed signal, by the comparison circuit 403.

In this arrangement, the storage means for the movie/still discriminate circuit and that for de-interlace processing are separately required. However, the storage means 402 for movie/still discrimination has a capacity corresponding to at least one pixel, and the pixel to be compared is changed every field. Hence, movie/still discrimination in the display region can be realized at low cost.

Since the storage area is not shared by the de-interlace circuit or the like, various types of de-interlace circuits can be selectively used. This results in advantages such as improvement in development efficiency. Additionally, the circuits can easily be independently used for different application purposes.

(Fourth Embodiment)

Figure 6:
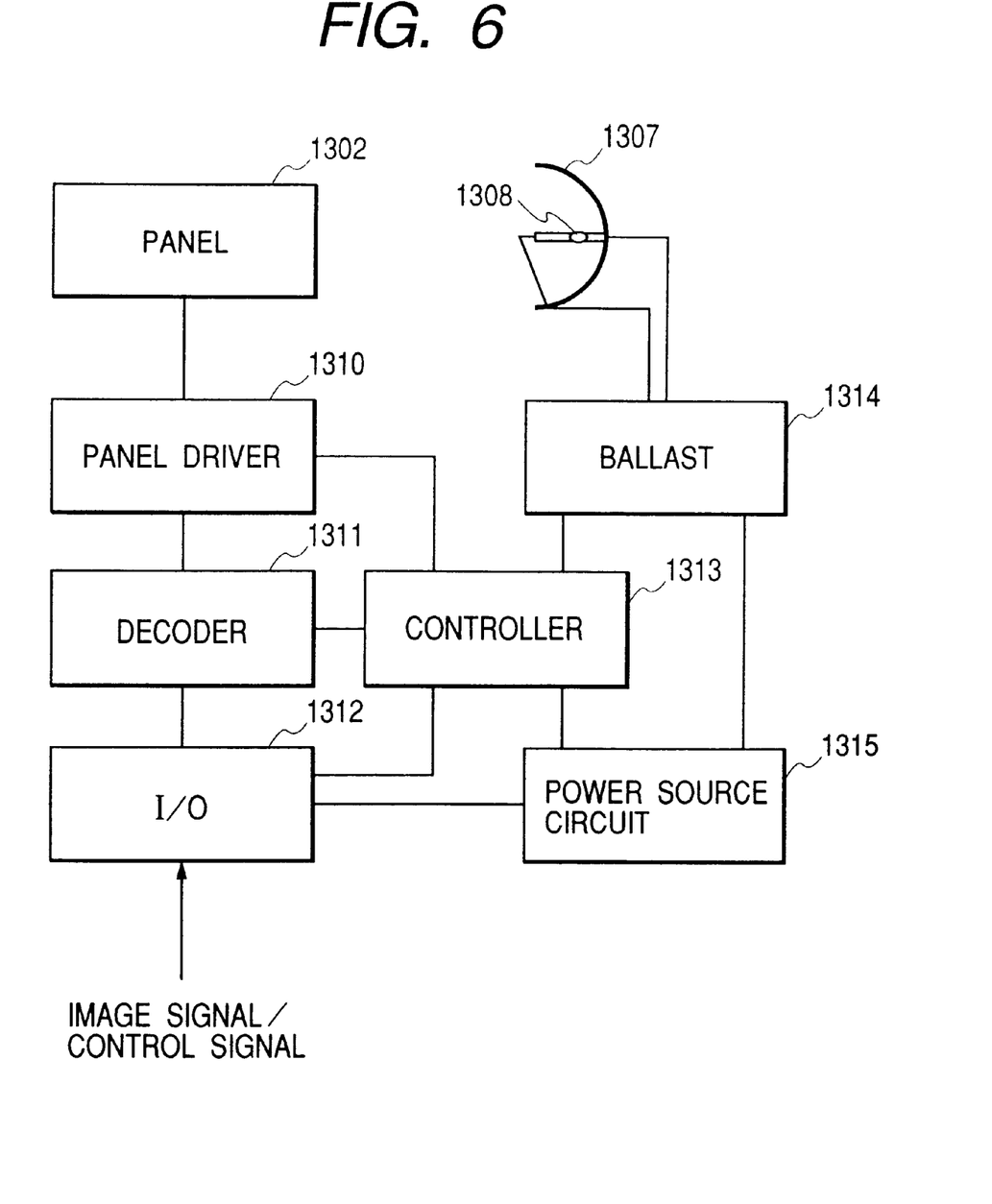
FIG. 6 is a block diagram showing the drive circuit system of a liquid crystal projector according to the fourth embodiment of the present invention.

FIG. 6 is a block diagram showing the drive circuit system of a liquid crystal projector (reflection-type liquid crystal display device) to which the present invention is applied. A panel driver 1310 corresponds to the LCD drive circuit 11 shown in FIG. 1. The panel driver 1310 inverts the polarities of R, G, and B image signals and forms a liquid crystal drive signal having a predetermined voltage gain. The panel driver 1310 also forms a drive signal for counter electrodes (not shown) and various timing signals. An interface 1312 corresponds to the selector 4 and its input-side arrangement shown in FIG. 1. The interface 1312 decodes various image and control transfer signals to standard image signals and the like. A decoder 1311 corresponds to the contrast adjustment circuit 5 to magnification & reduction circuit 9 shown in FIG. 1. The decoder 1311 decodes/converts the standard image signals from the interface 1312 into R, G, and B primary color image signals and sync signals, i.e., image signals corresponding to the liquid crystal panel 1302. A ballast 1314 drives and turns on a light source 1308 such as an arc lamp or a halogen lamp in an elliptical reflector 1307. A power source circuit 1315 supplies power to the circuit blocks. A controller 1313 incorporates an operation section (not shown) and includes a portion corresponding to the movie/still discriminate circuit 10 shown in FIG. 1. The controller 1313 systematically controls the circuit blocks.

Figure 7:
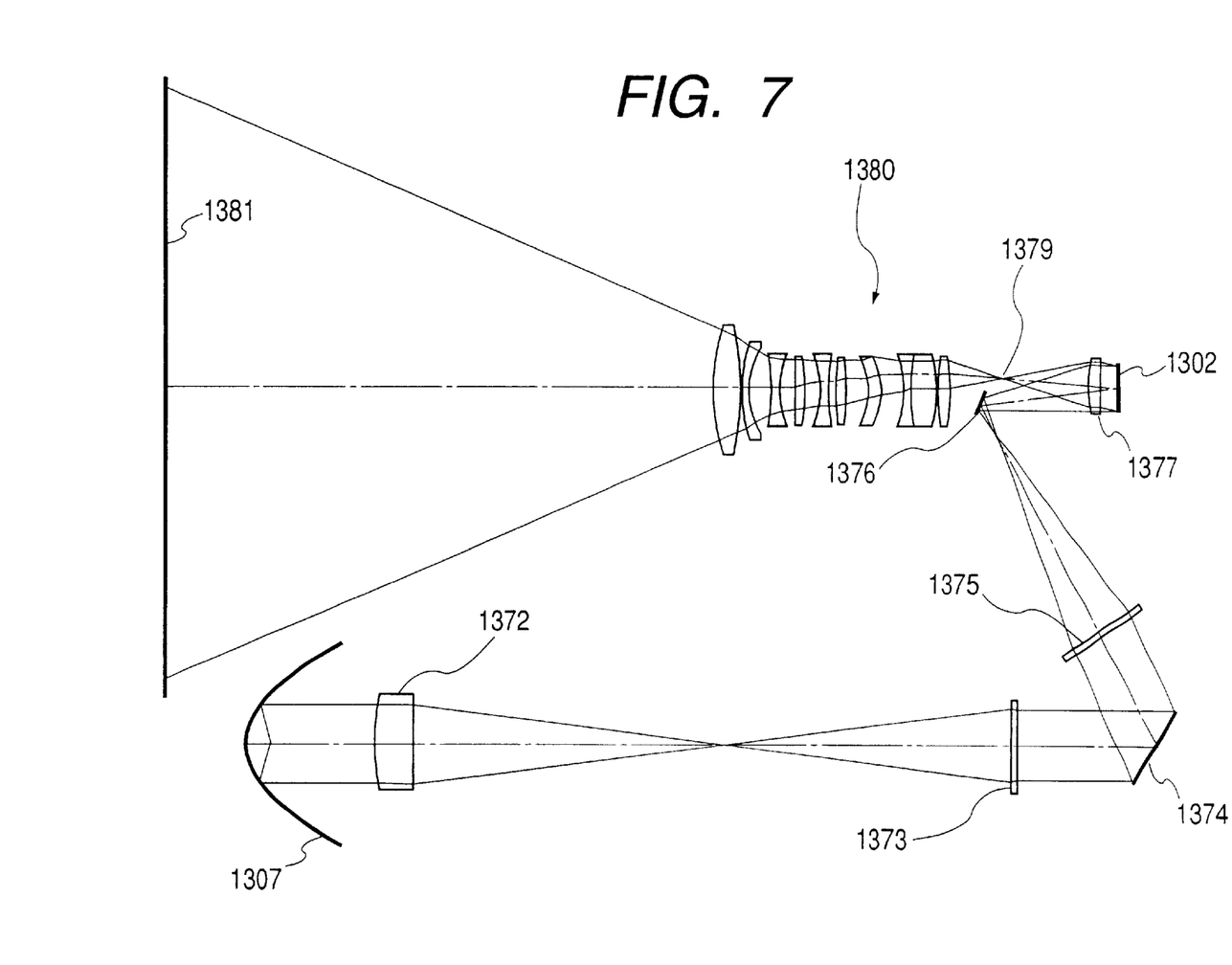
FIG. 7 is a view showing the optical system of the projector shown in FIG. 6.

FIG. 7 is a view showing the optical system of the projector shown in FIG. 6. Referring to FIG. 7, the optical system has a condenser lens 1372 for focusing a light source image by the reflector 1307, flat convex Fresnel lenses 1373 and 1375, and color separation optical element 1374 for separating light from the light source into R, G, and B light components. A dichroic mirror or a diffraction grating can be effectively used as the color separation optical element.

Mirrors 1376 guide the separated R, G, and B light components to the three liquid crystal panels 1302 for R, G, and B, respectively. A field lens 1377 illuminates the panels (reflection-type liquid crystal elements) 1302 with the collimated light of the focused beam separated into R, G, and B light components. An iris is present at a position 1379. A projecting lens 1380 combines a plurality of lenses to magnify the image on the reflection-type liquid crystal panel 1302. A screen 1381 is normally constructed by two lenses, i.e., a Fresnel lens for converting projected light into collimated light and a lenticular lens for displaying an image at a wide viewing angle in the vertical and horizontal directions, thereby obtaining a bright image at high contrast. Although FIG. 7 shows only one color panel, the section from the color separation optical element 1374 to the iris portion 1379 is separated into three colors, and three panels are used. When a microlens array is provided on the surface of the reflection-type liquid crystal panel to irradiate different pixel regions with different incident light components, a color image can be displayed even using one panel without using the three panels.

When a voltage is applied to the liquid crystal layer of the liquid crystal element 1302, light positively reflected by each pixel is transmitted through the iris portion 1379 and projected onto the screen. When the liquid crystal layer is forming a scattered body without any voltage application, light incident on the reflection-type liquid crystal element is isotropically scattered. For this reason, light except scattered light within the angle including the iris portion 1379 does not enter the projecting lens. At this time, a black image is displayed. As is apparent from the above-described optical system, the reflection-type liquid crystal projector of this embodiment does not require any polarizing plate. In addition, since signal light on the entire surface of the pixel electrodes enters the projecting lens at high reflectance, display brighter than that of the prior art by 2 to 3 times can be realized.

The display means of the present invention can also be applied to a digital display device such as a liquid crystal display device or plasma display.

As has been described above, according to the present invention, the first de-interlace mode in which interlaced scanning line signals in the consecutive odd- and even-numbered fields are received by storage means, and the scanning line signals in the consecutive odd- and even-numbered fields are alternately read out to perform de-interlacing, and the second de-interlace mode in which scanning line signals in the odd- or even-numbered field are read out in units of fields and magnified in the vertical direction to perform de-interlacing are prepared. The scanning line signals are compared between the fields to determine whether the signal is a movie or a still image. When it is determined that the signal is a still image, the signal is displayed on the display device using a non-interlaced signal obtained in the first de-interlace mode. When it is determined that the signal is a movie, the signal is displayed on the display device using a non-interlaced signal obtained in the second de-interlace mode. For this reason, even when the image signal is an interlaced image signal input from a video camera, an image having resolution optimum for the characteristics of the input image can be displayed. Since a still image and a movie can be optimally displayed at low cost, a high-quality, high-resolution image can be displayed even on a large display panel.

Especially, in a large display panel such as a liquid crystal projector which projects an image for magnification display, relative degradation in resolution due to magnification display and line flicker in the interlace mode are improved. For this reason, high display resolution and high image quality can be realized at low cost.

What is claimed is:

1. An image signal processing apparatus comprising:
   first de-interlace means for receiving interlaced scanning line signals of consecutive odd- and even-numbered fields by storage means and alternately reading out the scanning line signals of the consecutive odd- and even-numbered fields in units of scanning lines to perform de-interlacing;
   second de-interlace means for reading out the scanning line signals in the odd- or even-numbered field in units of fields and performing magnification processing in a vertical direction to perform de-interlacing;
   means for magnifying a non-interlaced signal obtained by said first and second de-interlace means, wherein said magnification means performs filter calculation for linear interpolation using at least two adjacent scanning line signals of the non-interlaced signal to perform magnification processing; and
   display control means for determining whether an input-image is a movie or a still image, when it is determined that the input-image is a still image, displaying the input-image on display means using a non-interlaced signal obtained by said first de-interlace means, and when it is determined that the input-image is a movie, displaying the input-image on said display means using a non-interlaced signal obtained by said second de-interlace means.

2. An apparatus according to claim 1, further comprising a plurality of connection terminals including at least one digital image input terminal and one analog image input terminal which input an interlaced image signal.

3. An apparatus according to claim 1, further comprising means for switching between a mode in which said first and second de-interlace means are automatically switched on the basis of a result from movie/still discriminate means in said display control means and a mode in which one of said first and second de-interlace means can be forcibly selected.

4. An image signal processing method comprising:
   a first de-interlace step of receiving interlaced scanning line signals of consecutive odd- and even-numbered fields by storage means and alternately reading out the scanning line signals of the consecutive odd- and even-numbered fields in units of scanning lines to perform de-interlacing;
   a second de-interlace step of reading out the scanning line signals in the odd- or even-numbered field in units of fields and performing magnification processing in a vertical direction to perform de-interlacing; and
   magnifying a non-interlaced signal obtained by said first and second de-interlace steps, wherein magnification is performed by filter calculation for linear interpolation using at least two adjacent scanning line signals of the non-interlaced signal to perform magnification processing,
   wherein, when it is determined that an input-image is a still image, the input-image is displayed on display means using a non-interlaced signal obtained in the first de-interlace step, and when it is determined that the input-image is a movie, the input-image is displayed on said display means using a non-interlaced signal obtained in the second de-interlace step.

* * * * *

UNITED STATES PATENT AND TRADEMARK OFFICE
CERTIFICATE OF CORRECTION

PATENT NO.    : 6,507,368 B1
DATED         : January 14, 2003
INVENTOR(S)   : Sakashita It is certified that error appears in the above-identified patent and that said Letters Patent is hereby corrected as shown below:

Drawings,
Sheet 1, Fig. 1., reference numeral 9, "Redcution" should read -- Reduction --.
Sheet 4, Fig. 4., reference numeral 305, "De-Interface Circuit" should read -- De-Interlace Circuit --.
Sheet 4, Fig. 5., reference numeral 405, "De-Interface Circuit" should read -- De-Interlace Circuit --.

Column 5,
Line 1, "bright of" should read -- brightness of --.

Signed and Sealed this

Sixteenth Day of December, 2003

JAMES E. ROGAN
*Director of the United States Patent and Trademark Office*